United States Patent
Schilder et al.

(10) Patent No.: US 11,351,849 B2
(45) Date of Patent: Jun. 7, 2022

(54) ELECTRIC DRIVE DEVICE FOR A MOTOR VEHICLE, IN PARTICULAR FOR AN AUTOMOBILE

(71) Applicant: DAIMLER AG, Stuttgart (DE)

(72) Inventors: Tobias Schilder, Filderstadt (DE);
Philip Gansloser, Bad Ditzenbach (DE); Klaus Riedl, Tübingen (DE);
Tobias Haerter, Stuttgart (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 17/292,771

(22) PCT Filed: Oct. 31, 2019

(86) PCT No.: PCT/EP2019/079837
§ 371 (c)(1),
(2) Date: May 11, 2021

(87) PCT Pub. No.: WO2020/099137
PCT Pub. Date: May 22, 2020

(65) Prior Publication Data
US 2021/0394602 A1    Dec. 23, 2021

(30) Foreign Application Priority Data
Nov. 12, 2018  (DE) ...................... 10 2018 008 939.9

(51) Int. Cl.
*F16H 3/66*     (2006.01)
*B60K 1/00*     (2006.01)

(52) U.S. Cl.
CPC ................ *B60K 1/00* (2013.01); *F16H 3/66* (2013.01); *B60K 2001/001* (2013.01);
(Continued)

(58) Field of Classification Search
CPC ................ B60K 1/00; B60K 2001/001; F16H 2200/2007; F16H 2200/2035;
(Continued)

(56) References Cited

U.S. PATENT DOCUMENTS 4,531,428 A * 7/1985 Windish .................... F16H 3/66
                                                      475/279
4,799,158 A    1/1989 Patil
(Continued)

FOREIGN PATENT DOCUMENTS

DE    102014220347 A1    4/2016
DE    102016004373 A1    10/2017
(Continued)

OTHER PUBLICATIONS

Machine translation of DE 102016004373 A1 (Year: 2017).*
(Continued)

*Primary Examiner* — David R Morris
*Assistant Examiner* — Farhana Pervin
(74) *Attorney, Agent, or Firm* — Patent Portfolio Builders PLLC

(57) ABSTRACT

An electric drive device has a planetary gear set, which includes has a first sun gear, a first planet carrier and a first ring gear. The drive device also includes a planetary gear set with a second sun gear that is or can be non-rotatably coupled to the first ring gear, a second planet carrier and a second ring gear that is or can be non-rotatably coupled to the first planet carrier. An electric motor has a rotor with an input shaft driveable by the rotor and permanently non-rotatably connected to the first sun gear. The drive device also includes an output shaft, a differential gear, a first switching element, and a second switching element. The planetary gear sets are arranged coaxially to the differential gear and the differential gear has a ball-shaped differential having a differential housing.

13 Claims, 4 Drawing Sheets

Figure 1:
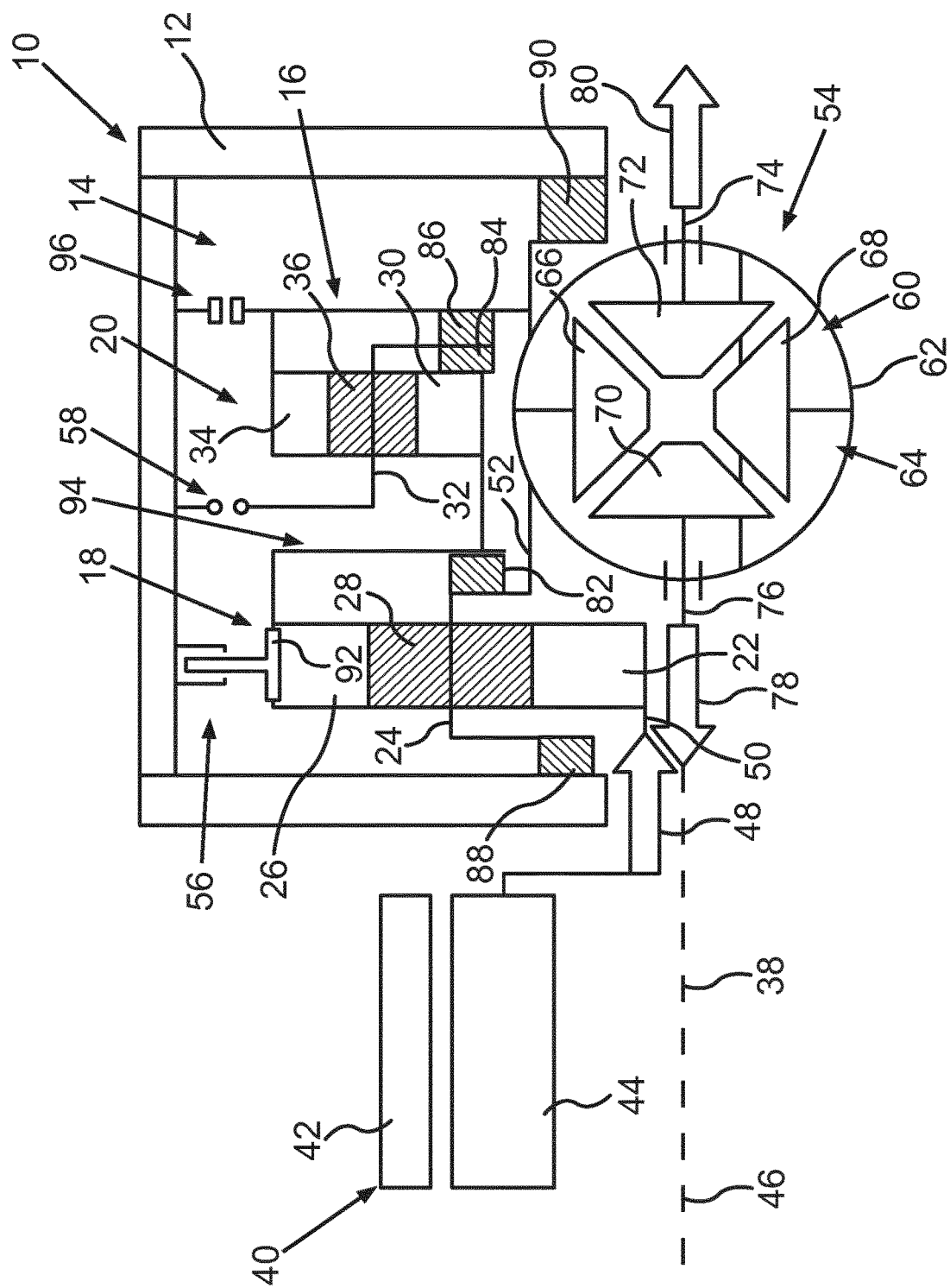

(52) U.S. Cl.
CPC . *B60Y 2410/102* (2013.01); *F16H 2200/2007* (2013.01); *F16H 2200/2035* (2013.01)

(58) Field of Classification Search
CPC ......... F16H 63/3416; F16H 2200/0021; F16H 2200/0034; F16H 2200/2066; F16H 2200/2064; F16H 2200/2094; F16H 3/66; B60Y 2410/102
See application file for complete search history.

(56) References Cited

U.S. PATENT DOCUMENTS

| | | | |
|---|---|---|---|
| 8,465,386 B2* | 6/2013 | Kersting | B60K 6/40 |
| | | | 475/5 |
| 10,309,507 B2 | 6/2019 | Scharr et al. | |
| 2014/0287866 A1* | 9/2014 | Sugino | F16H 3/66 |
| | | | 475/269 |
| 2015/0111681 A1* | 4/2015 | Wirth | F16H 3/46 |
| | | | 475/150 |
| 2017/0307055 A1* | 10/2017 | Scharr | F16H 48/08 |

FOREIGN PATENT DOCUMENTS

| | | |
|---|---|---|
| DE | 102017006266 A1 | 1/2019 |
| DE | 102018000436 B3 | 4/2019 |
| JP | H05116549 A | 5/1993 |

OTHER PUBLICATIONS

International Search Report dated Feb. 14, 2020 in related/corresponding International Application No. PCT/EP2019/079837.
Office Action created on Jul. 8, 2019 in related/corresponding DE Application No. 10 2018 008 939.9.
Written Opinion dated Feb. 14, 2020 in related/corresponding International Application No. PCT/EP2019/079837.

* cited by examiner

ELECTRIC DRIVE DEVICE FOR A MOTOR VEHICLE, IN PARTICULAR FOR AN AUTOMOBILE

BACKGROUND AND SUMMARY OF THE INVENTION

Exemplary embodiments of the invention relate to an electric drive device for a motor vehicle, in particular for an automobile.

Similar electric drive devices are known, for example, from the subsequently published documents DE 10 2017 006 266 A1 and DE 10 2018 000 436 A1. From DE 10 2014 220 347 A1, an electric drive device is known in which a bevel gear differential is arranged within a planetary gear set.

Such an electric drive device for a motor vehicle is further to be understood as known from the generic JP H05 116 549 A. The electric drive device has a housing, a first planetary gear set, and a second planetary gear set. The planetary gear sets are arranged in the housing. The planetary gear set has a first sun gear, a first planet carrier and a first ring gear, wherein the first sun gear, the first planet carrier and the first ring gear are first elements of the first planetary gear set or are also referred to as first elements of the first planetary gear set. The second planetary gear set has a second sun gear non-rotatably coupled or couplable to the first ring gear, a second planet carrier and a second ring gear non-rotatably coupled or couplable to the first planet carrier. The second sun gear, the second planet carrier and the second ring gear are second elements of the second planetary gear set or are also referred to as second elements of the second planetary gear set.

Exemplary embodiments of the present invention are directed to an electric drive device of the type mentioned above in such a way that a particularly efficient operation and a particularly compact design of the drive device can be implemented.

The starting point is an electric drive device having an electric motor, which has a stator and a rotor. Furthermore, the electric drive device comprises an input shaft that can be driven by the rotor and is permanently non-rotatably connected to the first sun gear. Furthermore, the electric drive device comprises an output shaft and a differential gear. Furthermore, the electric drive device comprises a first switching element provided for non-rotatably connecting the first ring gear to the housing. In other words, the first ring gear is non-rotatably connectable to the housing by means of the first switching element. The drive device further comprises a second switching element provided for non-rotatably connecting one of the second elements to the housing or to one of the first elements. This means that, by means of the second switching element, one of the second elements is non-rotatably connectable to the housing or to one of the first elements. Furthermore, the planetary gear sets, the differential gear and the rotor of the electric motor are all arranged coaxially with respect to one another, and a side shaft assigned to the differential gear, which side shaft connects the differential gear to a wheel of the motor vehicle, runs inside the rotor and is arranged substantially coaxially with respect to the rotor.

In order to further develop an electric drive device in such a way that a particularly low-loss and thus efficient operation as well as a particularly compact design of the electric drive device can be implemented, it is provided according to the invention that the differential gear comprises a ball-shaped differential having a differential housing. The ball-shaped differential is, for example, a bevel gear differential which has, for example, differential gears rotatably mounted on the differential housing. In addition, the ball-shaped differential has, for example, output gears which mesh, in particular simultaneously, with the differential gears. The differential gears and the output gears are gearwheels of the ball-shaped differential, wherein the gearwheels are preferably designed as bevel gears. The output gears can be driven by the differential gears, wherein output shafts, for example, can be driven via the output gears. The differential gears in turn can be driven by the differential housing. The respective gears of the motor vehicle can, for example, be driven via the output shafts, which are, for example, designed as cardan shafts and/or are also referred to as side shafts. The ball-shaped differential is characterized in particular by the fact that the differential housing delimits a receiving space or receiving area in which said gearwheels are at least partially, in particular at least predominantly or completely, arranged or accommodated. The receiving space or receiving area is at least substantially round or spherical or spherical in segments on the inner periphery. The ball-shaped differential has a function which is already sufficiently known from the general prior art and will only be briefly explained below. By way of example, the ball-shaped differential allows a speed compensation between the wheels of the motor vehicle that can be driven by the ball-shaped differential or by the output gears, such that, for example, the wheels can rotate at different speeds, in particular when the motor vehicle is cornering, in particular while the wheels are being driven by the electric motor via the rotor. In other words, for example, the wheels can be driven electrically by the rotor and thus by the electric motor via the ball-shaped differential. If, for example, during cornering of the motor vehicle, the wheels are driven electrically by the electric motor, in particular via the output shafts, via the output gears and via the ball-shaped differential, the ball-shaped differential allows such a speed compensation between the wheels that, during cornering, the wheel on the outside of the corner rotates or can rotate at a higher speed than the wheel on the inside of the corner, in particular without causing excessive tension in the electric drive device. The function of the ball-shaped differential preferably also comprises that torques provided by the electric motor for electrically driving the wheels are transmitted via the ball-shaped differential to the wheels, in particular to the output gears and the output shafts.

Furthermore, it is provided according to the invention that the first sun gear is arranged axially, i.e., in the axial direction of the planetary gear sets, which are arranged coaxially to one another, for example, next to the differential housing. Here, the largest outer diameter of the differential housing is larger than an outer diameter, in particular the largest outer diameter, of the first sun gear.

By way of example, the respective element of the respective planetary gear set is rotatable relative to the housing around an axis of rotation, also referred to as the main axis of rotation, or rotates around the main axis of rotation when the respective planetary gear set is driven, i.e., when a torque is introduced into the planetary gear set, in particular when the respective element is not non-rotatably connected to the housing, i.e., is not non-rotatably fixed to the housing.

Both the term "axial" and the term "axial direction" refer to the main axis of rotation. The term "radial" and the term "radial direction" refer to a direction perpendicular to the main axis of rotation or perpendicular to the axial direction.

Furthermore, it is provided in accordance with the invention that the second sun gear is arranged axially, i.e., in the axial direction of the respective planetary gear set, overlapping the differential housing, such that, for example, at least a partial area of the differential housing is covered or overlapped by the first sun gear in a direction coinciding with the axial direction of the respective planetary gear set. By way of example, the differential gears are driven by driving the differential housing. By driving the differential housing, the differential housing is rotated, for example, around a differential axis of rotation, in particular relative to the housing. By the feature that the planetary gear sets are arranged coaxially to the differential gear, it is to be understood in particular that the main axis of rotation runs in parallel to the differential axis of rotation or that the main axis of rotation coincides with the differential axis of rotation. In particular, when the main axis of rotation runs in parallel to the differential axis of rotation, the main axis of rotation can be spaced apart from the differential axis of rotation.

Furthermore, it is provided according to the invention that the first switching element is arranged radially surrounding and at least partially axially overlapping the first planetary gear set. The feature that the first switching element is arranged radially surrounding the first planetary gear set is to be understood in particular to mean that at least a partial region of the first planetary gear set is covered outwardly by the first switching element in the radial direction of the first planetary gear set. Thus, for example, the first switching element at least partially, in particular at least predominantly or completely, surrounds the partial region of the first planetary gear set in a peripheral direction extending around the axial direction of the first planetary gear set. The feature that the first switching element is arranged axially overlapping the first planetary gear set is to be understood, for example, to mean that at least a part of the first planetary gear set is covered by the first switching element in the axial direction of the planetary gear set or in a direction coinciding with the axial direction of the first planetary gear set.

The term "switching element" means a device provided for non-rotatably connecting two shafts of a gearbox to each other, if required, and for releasing this connection again, if required. The term "switching element" comprises a force transmission area and an associated actuator system. The force transmission area can, for example, comprise two claw halves in a known manner or, alternatively, an outer lamella pack and an inner lamella pack in a known manner. The associated actuator can comprise, for example, a hydraulic or pneumatic piston-cylinder unit or, alternatively, a known electromechanical adjustment device such as a shift drum, for example.

What is meant by the first switching element being arranged at least partially axially overlapping the first planetary gear set is that at least a part of the force transmission area of the first switching element or at least a part of the actuator system of the first switching element is arranged axially overlapping at least a part of the first planetary gear set. Particularly advantageously, at least part of the force transmission area of the first switching element is arranged axially overlapping the first planetary gear set.

In one development of the invention, it is provided that the second switching element is arranged axially, i.e., in the axial direction of the planetary gear sets, substantially on a side of the first planetary gear set facing away from the electric motor. By "substantially", it is meant that the second switching element, which has a second force transmission area and a second associated actuator, can be arranged partially axially overlapping the first planetary gear set, but that at least a larger part of the second switching element in the axial direction is arranged axially non-overlapping the first planetary gear set and on a side of the first planetary gear set facing away from the electric motor.

Particularly advantageously, the second switching element is arranged axially between the first planetary gear set and the second planetary gear set, wherein, for example, at least a part of the second switching element is covered or overlapped by the second planetary gear set on a side facing away from the first planetary gear set in the axial direction of the planetary gear sets and by the first planetary gear set on a side facing away from the second planetary gear set in the axial direction of the planetary gear sets.

In the context of the invention, a non-rotatable connection of two, in particular rotatably mounted, elements means, in particular, that the two non-rotatably connected elements are arranged coaxially with respect to one another and are connected to one another in such a way that they rotate at the same angular speed, in particular when they are driven.

A non-rotatable connection of an element to the housing is to be understood to mean that the element connected non-rotatably to the housing is connected to the housing in such a way that the element connected non-rotatably to the housing cannot be rotated relative to the housing, i.e., that the element connected non-rotatably to the housing is secured against relative rotation relative to the housing.

The term "input side" with respect to an element means an axial side of the respective element facing the input shaft or facing away from the output shaft. The term "output side" in relation to an element means a side of the respective element facing away from the input shaft or facing the input shaft.

The first switching element can, for example, be switched between a first connection state and a first release state. The first connection state corresponds, for example, to at least one first connection position, wherein the first release state corresponds, for example, to at least one first release position. Thus, for example, the first switching element can be moved, in particular relative to the housing and/or translationally, between the first connection position and the first release position. In the first connection state, the first ring gear is non-rotatably connected to the housing by means of the switching element, such that the first ring gear in particular cannot rotate relative to the housing even when the first planetary gear set is driven. However, in the first release state, the first switching element releases the first ring gear for rotations relative to the housing, such that the first ring gear in particular rotates relative to the housing, in particular around the main axis of rotation, when the first planetary gear set is driven.

The second switching element can be switched, for example, between a second connection state and a second release state. The second connection state corresponds, for example, to at least one second connection position of the second switching element, wherein the second release state corresponds, for example, to at least one second release position of the second switching element. The second switching element can be moved, for example, in particular translationally and/or relative to the housing, between the second connection state and the second release state. In the second connection state, the one second element is non-rotatably connected to the housing or to the one first element by means of the second switching element, such that the one second element cannot rotate relative to the housing or relative to the one first element, in particular, even when the planetary gear set is driven. In the second release state, however, the second switching element releases the one second element for rotation relative to the housing or relative to the one first element, such that the one second element rotates or can rotate relative to the housing or relative to the one first element, in particular around the main axis of rotation, when the second planetary gear set is driven.

The feature that the second sun gear is non-rotatably coupled to the first ring gear can be understood to mean that the second sun gear is permanently non-rotatably coupled or connected to the first ring gear. The feature that the second sun gear can be non-rotatably coupled to the first ring gear can be understood to mean, for example, that a third switching element is provided that is designed to couple the second sun gear to the first ring gear. In other words, for example, the second sun gear can be non-rotatably connected or coupled to the first ring gear by means of the first switching element. For this purpose, for example, the third switching element has a third connection state and a third release state. The third connection state corresponds, for example, to at least one third connection position of the third switching element, wherein the third release state corresponds, for example, to a third release position of the third switching element. The third switching element can be moved, for example, in particular relative to the housing and/or translationally, between the third connection position and the third release position. In the third connection state, the second sun gear is non-rotatably connected to the first ring gear by means of the third switching element, such that the second sun gear cannot rotate relative to the first ring gear, in particular, even when the second planet carrier is driven. In the third release state, however, the third switching element releases the second sun gear for relative rotation relative to the first ring gear such that, for example, the second sun gear rotates or can rotate relative to the first ring gear, in particular around the main axis of rotation, when the second planet carrier is driven.

The feature that the second ring gear is non-rotatably coupled or connected to the first planet carrier can be understood to mean that the second ring gear is permanently non-rotatably coupled or connected to the first planet carrier. The feature that the second ring gear can be non-rotatably coupled to the first planet carrier can, for example, be understood to mean that a fourth switching element is provided by means of which the second ring gear can be non-rotatably coupled or connected to the first planet carrier. The fourth switching element has, for example, a fourth connection state and a fourth release state. The fourth connection state corresponds, for example, to at least one fourth connection position of the fourth switching element, wherein the fourth release state corresponds, for example, to at least one fourth release position of the fourth switching element. The fourth switching element can be moved, for example, in particular translationally and/or relative to the housing, between the fourth connection position and the fourth release position. In the fourth connection state, the second ring gear is non-rotatably coupled to the first planet carrier by means of the fourth switching element, such that in particular the second ring gear does not rotate or cannot rotate relative to the first planet carrier even when the second planetary gear set is driven. In the fourth release state, however, the fourth switching element releases the second ring gear for relative rotation relative to the first planet carrier, such that, for example, the second ring gear, in particular around the main axis of rotation, rotates or can rotate relative to the first planet carrier when the second planet carrier is driven.

In the context of the invention, a permanent non-rotatable coupling or connection means in particular that two components that are permanently non-rotatably connected to each other are permanently, i.e., always or sustainably, non-rotatably connected or coupled to each other, such that no coupling device or no switching element is provided by means of which this permanent non-rotatable coupling or connection could be cancelled or which can be switched between a coupling state that brings about the non-rotatable coupling and a decoupling state that cancels the non-rotatable coupling.

The electric drive device according to the invention enables a particularly advantageous electric driving of the motor vehicle, which is designed, for example, as an electric vehicle, in particular as a battery electric vehicle. The electric drive device can be designed as a power-shiftable transmission structure of coaxial and space-optimized construction having low power loss. By way of example, at least or exactly two driving gears can be implemented, which are suitable for both a forward drive and a reverse drive of the motor vehicle and can thus be used for both a forward drive and a reverse drive of the motor vehicle. By way of example, a first of the driving gears enables trailer operation. In addition, the first drive gear is provided, for example, for creep operations, in order to protect, for example, the electric motor and a power electronic system associated with the electric motor, via which the electric motor can be supplied with electrical energy, against overheating. At least one of the switching elements can be designed as a positive-locking switching element, in particular as a claw coupling, by means of which the respective components can be connected to one another, in particular exclusively, in a positive-locking, non-rotatable manner. The positive-locking switching element can be designed with or without a synchronizing unit for further loss reduction. In the invention, a clever coupling of the planetary gear sets and the use of the switching elements are provided. At least one of the switching elements or all switching elements or both the first switching element and the second switching element can be designed as brakes. The respective brake is preferably a friction brake, in particular a lamella brake. Preferably, it is provided that the electric drive device according to the invention has exclusively or only, and thus exactly two, planetary gear sets in the form of the planetary gear sets already described, such that the number of parts and thus the weight and the installation space requirement can be kept low. In addition, a modular system can be represented such that, for example, the aforementioned two gears or, on the other hand, more gears, in particular exactly three gears, can be implemented. Furthermore, it is conceivable that at least one of the switching elements is designed as a freewheel, whereby losses can be kept particularly low. If the switching elements are open, relative speeds in the open running switching elements can be kept low. In addition, relative speeds in the planetary gear sets can be kept low, such that a particularly low-loss and thus efficient operation can be represented. In addition, particularly good accessibility to the switching elements can be ensured, in particular if both the first switching element and the second switching element are designed as brakes, in particular as friction brakes. Furthermore, due to the multiple gears, the speeds of the electric motor can be kept low even at high speeds at which the motor vehicle is powered or driven.

In a particularly advantageous embodiment of the invention, the electric drive device has a first axial bearing designed to axially support the first planet carrier relative to the second sun gear. In other words, by means of the first axial bearing, for example, the first planet carrier can be or is axially supported relative to the second sun gear or on the second sun gear. In the context of the invention, an axial bearing is generally understood to mean a bearing that can absorb axial forces.

In this context, the first axial bearing is arranged in a particularly advantageous manner axially, i.e., in the axial direction of the respective planetary gear set, between the first planetary gear set and the second planetary gear set. In this way, a low-loss bearing can be represented in a particularly space-saving manner.

A further embodiment is characterized in that the electric drive device has a second axial bearing designed to support the second sun gear axially with respect to the second planet carrier. In other words, for example, the second sun gear can be or is axially supported against the second planet carrier or on the second planet carrier by means of the second axial bearing. In this way, the installation space requirement can be kept particularly low.

It has proved to be particularly advantageous if the electric drive device has a third axial bearing. The third axial bearing is designed to support the second planet carrier axially against the second ring gear, wherein the third axial bearing is arranged axially on the output side of the second axial bearing. In other words, for example, the second planet carrier can be or is supported in the axial direction against the second ring gear or on the second ring gear by means of the third axial bearing and is thus mounted, such that an efficient and low-loss bearing can be represented in an installation space-saving manner.

In a particularly advantageous embodiment of the invention, the electric drive device comprises a fourth axial bearing designed to support the first planet carrier axially against the housing. Thus, for example, the first planet carrier can be or is supported in the axial direction against the housing or on the housing by means of the fourth axial bearing and is thus mounted. The fourth axial bearing is arranged on the input side of the first planetary gear set. This means that the installation space requirement and thus the external dimensions of the electric drive device can be kept within a particularly small framework.

A further embodiment is characterized by a fifth axial bearing designed to support the second ring gear against the housing. Thus, for example, the second ring gear can be or is supported in the axial direction against the housing or on the housing by means of the fifth axial bearing and is thus mounted. In order to be able to keep the installation space requirement particularly low, the fifth axial bearing is arranged axially on the output side of the second planetary gear set and radially within the largest outer diameter of the differential housing. The differential housing is also referred to as a differential cage, for example, or is designed as a differential cage on which at least the differential gears can be rotatably mounted.

In order to be able to represent a particularly efficient operation in a manner that saves installation space, it is provided in a further embodiment of the invention that the first switching element is designed as a lamella switching element. In this case, the first switching element has, for example, a plurality of lamellae, in particular friction lamellae, which are arranged one behind the other or in succession in the axial direction and can be pressed together or compressed. In this way, for example, the first switching element can non-rotatably connect at least or exactly two of the components to each other, in particular exclusively by friction. In this context, it has been shown to be advantageous if the second switching element has at least one positive-locking element and is thus preferably designed as a positive-locking switching element, in particular as a claw coupling. In this way, a particularly efficient operation can be ensured.

In a further embodiment of the invention, the first switching element has an inner lamella carrier, in particular if it is designed as a lamella switching element. By way of example, inner lamellae of the first switching element can be supported on the inner lamella carrier, in particular in the peripheral direction running around the main axis of rotation, such that, for example, torques running around the main axis of rotation can be transmitted between the inner lamellae and the inner lamella carrier. It has proved to be particularly advantageous if the inner lamella carrier of the first switching element is formed in one piece with the first ring gear and is non-rotatably connected via a plug-in or welded connection to a first connecting element, which is non-rotatably connected via a plug-in or welded connection to the second sun gear. Accordingly, a particularly efficient operation can be implemented in a cost-effective manner. In addition, the installation space requirement of the drive device can thereby be kept within a particularly small framework.

In a further embodiment of the invention, the electric drive device comprises a second connecting element formed integrally with an inner lamella carrier of the first switching element and non-rotatably connected to the first ring gear on a first side by means of a first plug-in or welded connection and is non-rotatably connected to the second sun gear on a second side by means of a second plug-in or welded connection. This makes it possible to keep the installation space requirement low in a particularly simple manner.

A further embodiment is characterized in that the first ring gear is non-rotatably connected, in particularly permanently, to the second sun gear, wherein the second switching element is provided to non-rotatably connect the second planet carrier to the housing. Thus, it is preferably provided that the one second element is the second planet carrier. This ensures a particularly compact design.

In a further advantageous embodiment of the invention, the second ring gear is non-rotatably connected, in particular permanently, to the first planet carrier. As a result, the number of parts and thus the installation space requirement and the costs as well as the weight can be kept particularly low.

Finally, it has been shown to be particularly advantageous if the electric drive device comprises a connecting piece designed as a hollow shaft. The connecting piece is arranged radially, i.e., in the radial direction between the differential housing and the second sun gear, and is permanently non-rotatably connected to the first planet carrier and permanently non-rotatably connected to the second ring gear. This means that the number or parts and thus the weight and installation space requirements can be kept particularly low.

The feature that the second switching element has at least one positive-locking element can be understood in particular as the following: in a first variant, the positive-locking element can be a positive-locking switching element per se, in particular a claw coupling. In the first variant, it is preferably provided that the second switching element has exclusively or only the positive-locking element and is thus designed, for example, as a positive-locking switching element as a whole, in particular as a claw coupling. In this way, for example, the second switching element in the first variant exclusively enables a positive-locking non-rotatable connection. In a second variant, it is conceivable that the positive-locking element is itself designed as a positive-locking switching element, in particular as a claw coupling.

In the second variant, the second switching element additionally comprises a frictionally-engaged switching element, in particular a lamella switching element. Thus, for example, in the second variant, the second switching element enables a positive-locking non-rotatable connection by means of the positive-locking element, and a force-locking or frictionally-engaged non-rotatable connection by means of the lamella element.

In a third variant, it is conceivable that the positive locking element is designed as an, in particular, switchable freewheel. In the third variant, the second switching element is preferably designed as a whole or integrally as a particularly switchable freewheel, such that the second switching element in the third variant only or exclusively has the switchable freewheel as the positive-locking element. Thus, in the third variant, the second switching element exclusively enables a positive-locking non-rotatable connection. In a fourth variant, the positive-locking element is designed as the freewheel described above, in particular as the switchable freewheel described above. In the fourth variant, the second switching element further comprises a frictionally-engaged or force-locking element such as, for example, a lamella switching element. Thus, in the fourth variant, the second switching element can enable a force-locking or frictionally-engaged non-rotatable connection as well as a positive-locking non-rotatable connection. The respective freewheel implements that the one second element is non-rotatably connected to the housing or to the one first element in a first direction running around the main axis of rotation, or the freewheel prevents relative rotations between the one second element and the housing or the one first element taking place around the main axis of rotation in the first direction of rotation. However, in a second direction of rotation running around the main axis of rotation and opposite to the first direction of rotation, the freewheel opens in such a way that the freewheel allows relative rotations between the one second element and the housing or the one first element in the second direction of rotation. Thus, the one second element is braked or not braked by means of the freewheel depending on the direction of rotation or is or is not non-rotatably connected to the housing with the one first element. If necessary or optionally, the freewheel is switchable such that it can be switched on or off. If the freewheel is switched on, the freewheel connects the one second element to the housing or to the one first element in the one first direction of rotation and allows relative rotations between the one second element and the housing or the one first element in the second direction of rotation. If the freewheel is switched off, then the freewheel allows relative rotations between the one second element and the housing or the one first element in the first direction of rotation as well as in the second direction of rotation, for example.

Further advantages, features and details of the invention arise from the following description of preferred exemplary embodiments and from the drawing. The features and combinations of features mentioned above in the description, as well as the features and combinations of features mentioned below in the description of figures and/or shown in the figures alone, can be used not only in the combination specified in each case, but also in other combinations or on their own, without leaving the scope of the invention.

BRIEF DESCRIPTION OF THE DRAWING FIGURES

Figure 3:
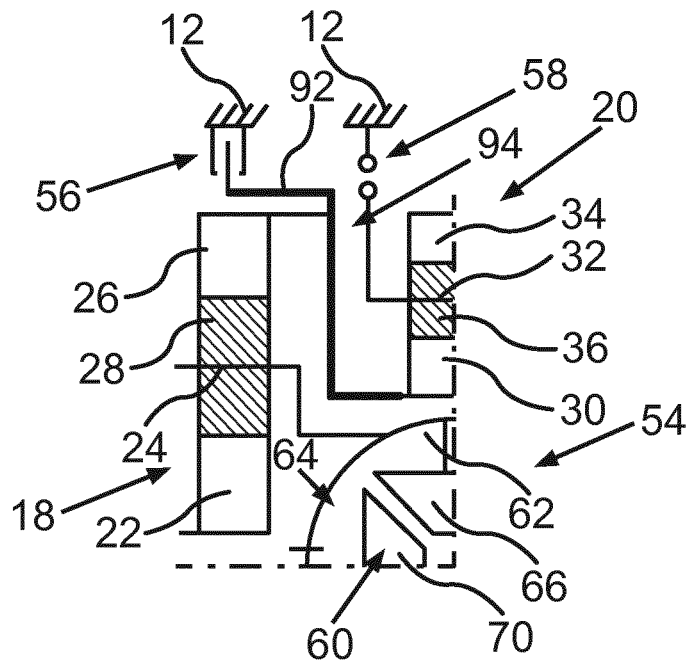
Figure 4:
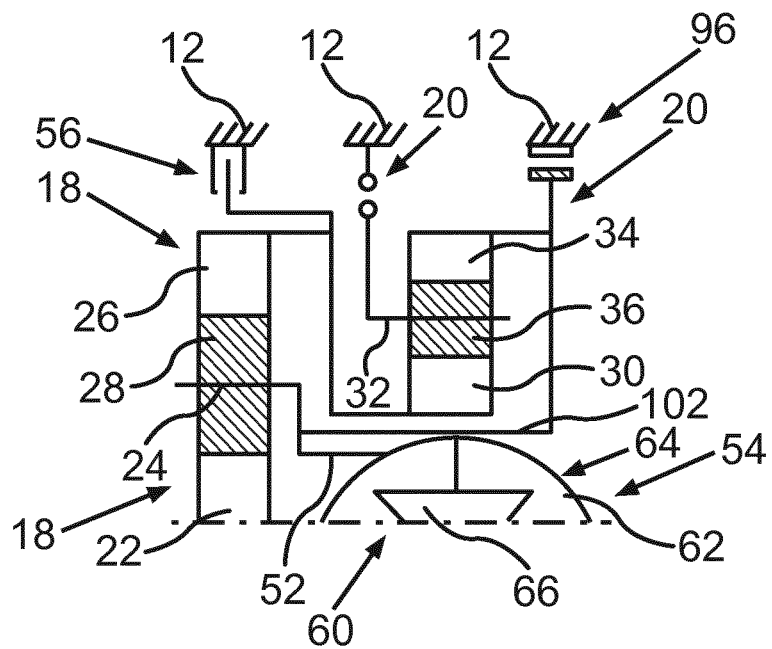
Figure 5A:
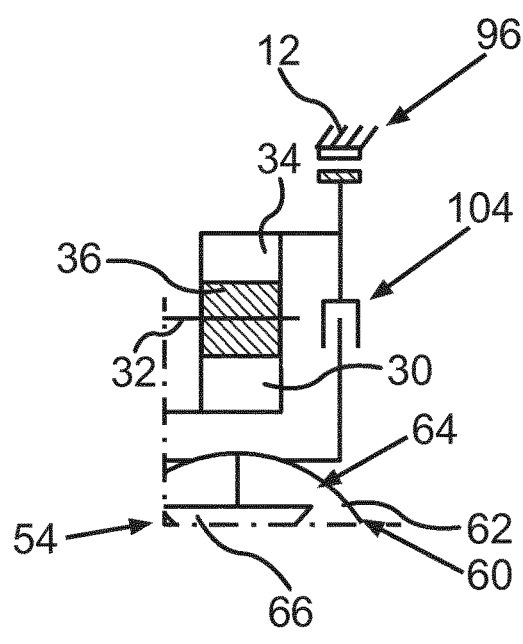

The drawing shows in:

FIG. 1 a schematic depiction of a first embodiment of an electric drive device for a motor vehicle according to the invention, FIG. 2a-d in each case in sections, a schematic depiction of a respective further embodiment of the electric drive device;

FIG. 3 in sections, a schematic depiction of a further embodiment of the electric drive device;

FIG. 4 in sections, a schematic depiction of a further embodiment of the electric drive device; and FIG. 5a, b in each case in sections, a schematic depiction of a further embodiment of the drive device.

In the figures, identical or functionally identical elements are provided with the same reference numerals.

DETAILED DESCRIPTION

FIG. 1 shows a schematic depiction of a first embodiment of an electric drive device 10 for a motor vehicle, in particular for an automobile such as, for example, a passenger car. The motor vehicle is designed, for example, as an electric vehicle, in particular as a battery electric vehicle, and can be driven, in particular exclusively, electrically. In this case, the motor vehicle can be driven electrically, in particular exclusively, by means of the drive device 10. The electric drive device 10 comprises a housing 12, depicted particularly schematically in FIG. 1, which delimits a receiving space 14, also referred to as a receiving area. The electric drive device 10 further comprises a planetary transmission 16, which is arranged or accommodated in the housing 12 and thus in the receiving space 14.

The planetary transmission 16 and thus the drive device 10 comprises a first planetary gear set 18 and a second planetary gear set 20, which are arranged coaxially with respect to each other.

The first planetary gear set 18 has a first sun gear 22, a first planet carrier 24, and a first ring gear 26. The sun gear 22, the planet carrier 24, and the ring gear 26 are first elements of the planetary gear set 18 or are also referred to as first elements. Furthermore, the first planetary gear set 18 comprises at least one first planetary gear 28, which is rotatably mounted on the planet carrier 24 and simultaneously meshes with the sun gear 22 and with the ring gear 26.

The second planetary gear set 20 has a second sun gear 30, a second planet carrier 32, and a second ring gear 34. The sun gear 30, the planet carrier 32, and the ring gear 34 are second elements of the planetary gear set 20 or are also referred to as second elements. The sun gears 22 and 30, the planet carriers 24 and 32 and the ring gears 26 and 34 and the housing 12 are also referred to as structural elements of the drive device 10. The planetary gear sets 18 and 20 are thereby accommodated or arranged in the receiving space 14 and thus in the housing 12. The second planetary gear set 20 further comprises at least one second planetary gear 36, which is rotatably mounted on the planet carrier 32 and simultaneously meshes with the sun gear 30 and with the ring gear 34. The planet carriers 24 and 32 are also referred to as webs.

In particular, when the respective element is non-rotatably connected to the housing 12, the respective element can rotate around an axis of rotation, also referred to as the main axis of rotation 38, relative to the housing 12, or the respective element can rotate around the main axis of rotation 38 relative to the housing 12, in particular, when the respective planetary gear set 18 or 20 is driven, that is, when a torque is introduced into the respective planetary gear set 18 or 20. Alternatively or additionally, the respective components can rotate around the main axis of rotation 38 relative to one another, in particular when the respective components are non-rotatably connected to one another. By way of example, if two of the structural elements are non-rotatably connected to each other or non-rotatably coupled to each other, the non-rotatably connected structural elements are secured against rotations occurring around the main axis of rotation 38 and relative to each other. By way of example, if two of the elements are non-rotatably connected or coupled to each other, and the planetary gear sets 18 and 20 are driven, the non-rotatably connected elements rotate together and thus as a block around the main axis of rotation 38, in particular relative to the housing 12. This means that the non-rotatably connected elements then revolve as a block. By way of example, if the respective element is non-rotatably connected or coupled to the housing 12, the respective element is secured against rotation relative to the housing 12 and around the main axis of rotation 38, such that the respective element non-rotatably connected to the housing 12 cannot rotate relative to the housing 12 around the main axis of rotation 38.

It can be seen from FIG. 1 that the second sun gear 30 is or can be non-rotatably coupled to the first ring gear 36. In the first embodiment shown in FIG. 1, the sun gear 30 is non-rotatably coupled or connected, in particular permanently, to the ring gear 26 such that, in particular when the planetary gear sets 18 and 20 are driven, the ring gear 26 and the sun gear 30 rotate together and thus as a block both at the same or at identical angular velocity around the main axis of rotation 38 relative to the housing 12, in particular when the ring gear 26 and the sun gear 30 are not non-rotatably connected to the housing 12 .

Furthermore, the second ring gear 34 is or can be non-rotatably coupled, in particular permanently, to the first planet carrier 24. In the first embodiment shown in FIG. 1, the ring gear 34 is non-rotatably coupled, in particular permanently, to the planet carrier 24, such that the planet carrier 24 and the ring gear 34 rotate, in particular together and thus as a block, relative to the housing 12 around the main axis of rotation 38 when the planetary gear sets 18 and 20 are driven and the planet carrier 24 and the ring gear 34 are not non-rotatably fixed to the housing 12.

The drive device 10 further comprises an electric motor 40, depicted particularly schematically in FIG. 1, by means of which the motor vehicle can be electrically driven. By way of example, at least or exactly two wheels of the motor vehicle spaced apart from each other in the transverse direction of the vehicle can be driven electrically by means of the electric motor 40. By electrically driving the wheels, the motor vehicle as a whole can be electrically driven. For this purpose, the electric motor 40 comprises a stator 42, depicted particularly schematically in FIG. 1, and a rotor 44. The rotor 44 is rotatable around a machine rotation axis 46 relative to the stator 42. The machine rotation axis 46 runs in parallel to the main axis of rotation 38. In the first embodiment, the machine rotation axis 46 coincides with the main axis rotation 38. In particular, the rotor 44 can be driven by the stator 42 and thereby can be rotated around the machine rotation axis 46 relative to the stator 42. The electric motor 40 can be operated in an engine mode and thus as an electric engine. In the engine mode, the stator 42 drives the rotor 44, whereby the rotor 44 is rotated relative to the stator 42 around the machine rotation axis 46. Via the rotor 44, the electric motor 40 can provide torques for, in particular purely, electrically driving the wheels and thus the motor vehicle. This respective torque provided by the electric motor 40 via the rotor 44 for electrically driving the wheels is illustrated in FIG. 1 by an arrow 48.

The drive device 10, in particular the planetary transmission 16, has an input shaft 50 permanently non-rotatably connected to the first sun gear 22, which input shaft can be driven by the rotor 44 and, in particular, can be rotated relative to the housing 12 around the main axis of rotation 38 or around the main axis of rotation 46. By way of example, the input shaft 50 is or can be non-rotatably connected, in particular permanently, to the rotor 44. The elements of the planetary gear sets 18 and 20 and the input shaft 50 are also referred to as components, for example. With reference to a torque flow running from the rotor 44 via the planetary transmission 16 to the wheels, via which torque flow the respective torque provided by the electric motor 40 via its rotor 44 is transmitted from the rotor 44 to the wheels, the input shaft is the first of the components to which the respective torque provided by the electric motor is transmitted. In other words, the input shaft 50 is arranged upstream of the other or all other components in the torque flow, such that the respective torque provided by the electric motor 40 via the rotor 44 is transmitted to the components initially or first to the input shaft 50 and only then to the respective remaining or other components. In this way, for example, the respective torque provided by the electric motor 40 can be introduced into the planetary transmission 16 via the input shaft 50.

The drive device 10, in particular the planetary transmission 16, has an output shaft 52 that can be rotated relative to the housing 12, in particular around the main axis of rotation 38, and via which the planetary transmission 16 can provide torques in the form of output torques, in particular for driving the wheels. The respective output torque results from the respective torque provided by the electric motor 40. The respective output torque can be discharged from the planetary transmission 16 via the output shaft 52.

The drive device 10 further comprises a differential gear 54, simply also referred to as a differential. The differential gear 54 is assigned to the axle, for example, and is thus simply also referred to as an axle gear. By way of example, the wheels of the axle can be driven by the electric motor 40 via the differential gear 54. Thus, the differential gear 54 has in particular the function of distributing the respective torque provided by the electric motor 40 to the wheels. The differential gear 54 also has the function, for example, of allowing speed compensation between the wheels or different speeds of the wheels when the motor vehicle is cornering. The differential gear 54 can be driven by the output shaft 52 or by the planetary transmission 16 via the output shaft 52, as will be explained in more detail below.

The electric motor 40, the first planetary gear set 18, and the second planetary gear set 20 are advantageously arranged one after the other in the aforementioned sequence in the axial direction.

Advantageously, the two planetary gear sets 18 and 20, the electric motor 40, and the differential gear 54 are all arranged coaxially with respect to one another.

The drive device 10 has a first switching element 56, by means of which the first ring gear 26 can be non-rotatably connected to the housing 12. In addition, the drive device 10 has a second switching element 58 by means of which, in the first embodiment, the second planet carrier 32 can be non-rotatably connected to the housing 12. The planetary gear sets 18 and 20 are arranged coaxially with respect to the differential gear 54. Now, in order to be able to implement a particularly compact design as well as a particularly efficient operation of the drive device 10, the differential gear 54 comprises a ball-shaped differential 60, also referred to as a bevel gear differential and/or designed as a bevel gear differential, having a differential housing 62, also referred to as a differential basket or differential cage. In the embodiment, for example, the output shaft 52 is non-rotatably connected, in particular permanently, to the differential housing 62, and, for example, the ring gear 34 is also non-rotatably connected, in particular permanently, to the output shaft 52 and/or, in particular permanently, to the differential housing 62. Thus, for example, the ring gear 34 is non-rotatably connected, in particular permanently, to the planet carrier 24 via the differential housing 62 and/or via the output shaft 52.

The respective output torque provided by the output shaft 52 can be transmitted to the differential housing 62, whereby the differential housing 62 can be or is driven. By driving the differential housing 62, the latter is rotated around the main axis of rotation 68, in particular relative to the housing 12.

It can be seen from FIG. 1 that the ball-shaped differential 60 is characterized by the fact that the differential housing 62 delimits a receiving space 64, also referred to as a receiving area. The receiving space 64 is spherical or spherical in segments. The ball-shaped differential 60 is designed as a bevel gear differential which has two differential gears 66 and 68 rotatably mounted on the differential housing 62 and two output gears 70 and 72 that are rotatable, in particular, relative to the differential housing 62. The output gears 70 and 72 mesh simultaneously with the differential gears 66 and 68. The differential gears 66 and 68 and the output gears 70 and 72 are toothed gears which are designed as bevel gears. The gearwheels are at least partially, in particular at least predominantly or completely, arranged in the receiving space 64.

The output gears 70 and 72 are non-rotatably connected, in particular permanently, to respective shafts 74 and 76, also referred to as side shafts. In this case, the aforementioned wheels of the motor vehicle can be driven via the shafts 74 and 76, such that the wheels can be driven via the shafts 74 and 76 by the output gears 70 and 72 and thus by the differential gear 54.

In FIG. 1, respective arrows 78 and 80 illustrate a respective drive torque resulting from the respective output torque, by means of which the respective wheel or the respective shaft 74 or 76 can be or is driven. If the differential housing 62 is rotated around the main axis of rotation 38, in particular relative to the housing 12, the differential gears 66 and 68 are rotated around the main axis of rotation 38, in particular relative to the housing 12. Then, for example, the output gears 70 and 72 and, via these, the shafts 74 and 76 and thus the wheels are driven by the differential gears 66 and 68, whereby the motor vehicle can be driven as a whole.

The differential housing 62 is permanently non-rotatably connected to the first planet carrier 24. Furthermore, the first sun gear 22 is arranged axially adjacent to the differential housing 62, wherein the largest outer diameter of the differential housing 62 is larger than an outer diameter, in particular than the largest outer diameter, of the first sun gear 22. This means, for example, that the differential housing 62 projects outwardly beyond the sun gear 22 in a radial direction perpendicular to the axial direction of the respective planetary gear set 18 or 20.

The second sun gear 30 is arranged axially overlapping the differential housing 62, such that at least a part of the differential housing 62 is covered by the sun gear 30 in the radial direction of the respective planetary gear set 18 or 20 and thus in the radial direction of the drive device 10 towards the outside. An inner diameter of the second sun gear 30 is larger than the largest outer diameter of the differential housing 62. In particular, it is conceivable that at least a part of the differential housing 62, in particular the largest outer diameter of the differential housing 62, is arranged in the sun gear and is thus covered by the sun gear 30 in the radial direction outwards. Thus, for example, the sun gear 30 completely surrounds the aforementioned partial area of the differential housing 62 in the peripheral direction extending around the main axis of rotation 38. In other words, the differential housing 62, for example, penetrates the sun gear 30, in particular completely. Thus, the sun gear 30 is formed, for example, in the manner of a hollow shaft penetrated by the differential housing 62. The first switching element 56 is arranged radially surrounding and axially overlapping the first planetary gear set 18. Furthermore, the second switching element 58 is arranged axially between the first planetary gear set 18 and the second planetary gear set 20. In the first embodiment, the drive device 10 comprises a first axial bearing 82, by means of which the planet carrier 24 can be or is supported in the axial direction on the sun gear 30 and is thus mounted. In this case, the first axial bearing 82 is arranged in the axial direction between the planetary gear set 18 and the planetary gear set 20.

The drive device 10 further comprises a second axial bearing 84, by means of which the second sun gear 30 can be or is supported in the axial direction on the second planet carrier 32 and is thus mounted, wherein the second axial bearing 84 can be arranged axially on the output side of the second planet carrier 32 of the second planetary gear set 20. Furthermore, a third axial bearing 86 is provided, by means of which the second planet carrier 32 can be or is supported in the axial direction on the ring gear 34 and is thus mounted. The third axial bearing 86 can be arranged axially on the outlet side of the second axial bearing 84.

The drive device 10, in particular the planetary transmission 16, also has a fourth axial bearing 88, by means of which the first planet carrier 24 can be or is supported in the axial direction against the housing 12 and is thus mounted on the housing 12. The fourth axial bearing 88 can be arranged on the input side of the first planetary gear set 18.

Furthermore, the drive device 10 comprises a fifth axial bearing 90, via which the second ring gear 34 can be or is supported in the axial direction on the housing 12 and is thus mounted. The fifth axial bearing 90 can be axially on the outward side of the second planetary gear set 20 and radially within the largest outer diameter of the differential housing 62, such that, for example, the differential housing 62 projects in the radial direction outwardly beyond the fifth axial bearing 90.

In the first embodiment, the first switching element 56 is configured as a brake, in particular as a friction brake, and thereby as a lamella switching element, that is, as a lamella brake. Thus, for example, in the first embodiment, the ring gear 26 can be non-rotatably fixed to the housing 12 by means of the switching element 56, in particular exclusively, in a frictional- or force-fitting manner. In contrast, the second switching element 58 has at least one positive-locking element, such that in the first embodiment, the planet carrier 32 can be non-rotatably connected to the housing 12 by means of the switching element 58, at least or exclusively in a positive-locking manner. In the first embodiment, the switching element 58 is formed entirely or exclusively or completely as a positive-locking switching element, such that the planet carrier 32 can be non-rotatably connected to the housing 12 exclusively in a positive-locking manner by means of the switching element 58. The positive-locking element is, for example, a claw coupling, such that, for example, in the first embodiment, the switching element 58 is formed entirely or completely as a claw coupling. Furthermore, in the first embodiment, the first ring gear 26 is non-rotatably connected, in particular permanently, to the second sun gear 30. In addition, the second ring gear 34 is permanently non-rotatably connected to the first planet carrier 24, for example via the output shaft 52 and/or via the differential housing 62.

Since the switching element 56 is designed as a lamella switching element, the switching element 56 has an inner lamella support and inner lamellae. The inner lamellae are or can be supported on the inner lamella carrier in the peripheral direction around the main axis of rotation 38, such that torques running around the main axis of rotation 38 can be transmitted between the inner lamellae and the inner lamella carrier. The inner lamella carrier is designated 92 in FIG. 1 and is formed integrally with the first ring gear 26. A connecting element 94 is provided, for example, which is non-rotatably connected to the second sun gear 30, in particular by means of a plug-in or welded connection. Thus, for example, the sun gear 30 and the connecting element 94 are separately formed parts that are non-rotatably connected to each other by means of a plug-in or welded connection. The connecting element 94 is thereby non-rotatably connected, in particular via a plug-in or welded connection, to the ring gear 26 and thus is non-rotatably connected to the inner lamella carrier 92. Thus, the ring gear 26 and the connecting element 94 are separately formed parts which are non-rotatably connected to each other, in particular via a plug-in or welded connection.

The drive device 10 further comprises a parking lock 96, by means of which the output shaft 52 and thus, for example, the differential housing 62 can be non-rotatably connected to the housing 12 and can thus be secured against relative rotations occurring around the main axis of rotation 38 and relative to the housing 12. In this way, the wheels of the motor vehicle can also be secured against unwanted rotation, such that, for example, by means of the parking lock 96, unwanted rolling away of the motor vehicle can be prevented, in particular when the motor vehicle is parked on a slope. By way of example, the output shaft 52, also referred to as the drive shaft, also passes through the sun gear 30, such that, for example, the output shaft 52 is guided through under the second planetary gear set 20 in order to non-rotatably connect the output shaft 52, in particular permanently, to the planet carrier 24 and thus, for example, to an output of the planetary gear set 18. In this way, for example, a torsional rigidity of a connection between the parking lock 96 and the differential housing 62 can be kept low.

Due to the arrangement of the axial bearings 82, 84, 86, 88 and 90, all axial forces in both directions coinciding with the axial direction can be transferred very well from the planetary transmission 16 into the housing 12. Particularly advantageous is the possibility of connecting the axial bearings 82, 84 and 86 on the same or similar diameter, such that an at least substantially straight-line force flow can be ensured. In the first embodiment illustrated in FIG. 1, the electric motor 40 is designed as an internal rotor, such that at least one longitudinal region of the rotor 44 is arranged inside the stator 42, or is covered by the 42 in the radial direction towards the outside. Of course, it is alternatively conceivable that the electric motor 40 is designed as an external rotor.

The following embodiments, which are not shown in the figures, are kinematically equivalent to the exemplary embodiment shown or to the first embodiment: the switching element 58, which is designed, for example, as a brake, in particular a friction or lamella brake, can be converted into a fixed element and into a brake, in particular into a friction brake. By way of example, it is conceivable that the planet carrier 32 is permanently non-rotatably connected to the housing. Then, for example, a switching element is provided, by means of which the ring gear 34 can be non-rotatably connected to the planet carrier 24. Alternatively, it is conceivable that the planet carrier 32 is permanently non-rotatably connected to the housing 12, the ring gear 34 is permanently non-rotatably connected to the planet carrier 24 and then, for example, a switching element is provided by means of which the sun gear 30 can be non-rotatably connected to the ring gear 26.

Figure 2A:
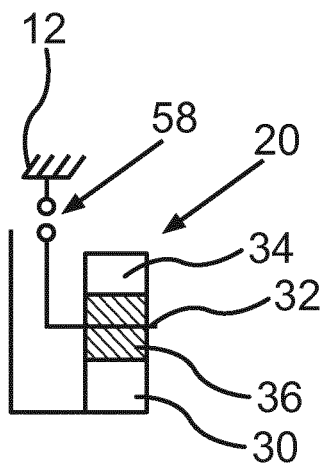

FIG. 2a shows a second embodiment, which can correspond to the first embodiment. In the second embodiment shown in FIG. 2a, the switching element 58 is designed overall or exclusively as a positive-locking switching element, in particular as a claw coupling, such that the aforementioned positive-locking element of the switching element 58 is a positive-locking connecting element or switching element. Thus, in the second embodiment, the planet carrier 32 can be non-rotatably connected to the housing 12 exclusively in a positive-locking manner by means of the switching element 58.

Figure 2B:
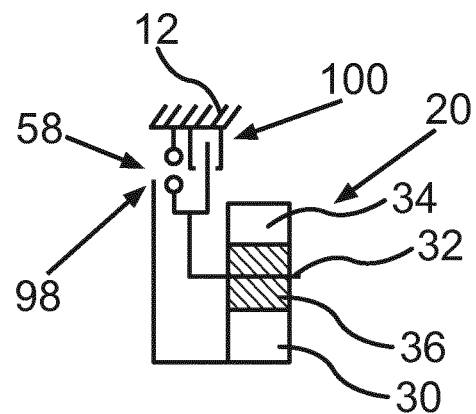

FIG. 2b shows a third embodiment. In the third embodiment, the positive-locking element 98 of the switching element 58 is a positive-locking element such as a claw coupling. Furthermore, in the third embodiment, the switching element 58 comprises a frictional switching element 100 such as a brake, in particular a friction or lamella brake. Thus, in the third embodiment, the planet carrier 32 can be non-rotatably connected to the housing 12 by means of the switching element 58 both in a positive-locking manner (positive-locking element 98) and in a force-fitting or frictional manner (frictional switching element 100).

Figure 2C:
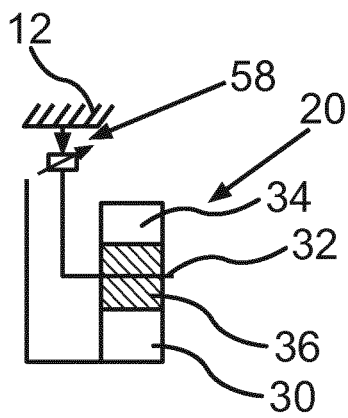
Figure 2D:
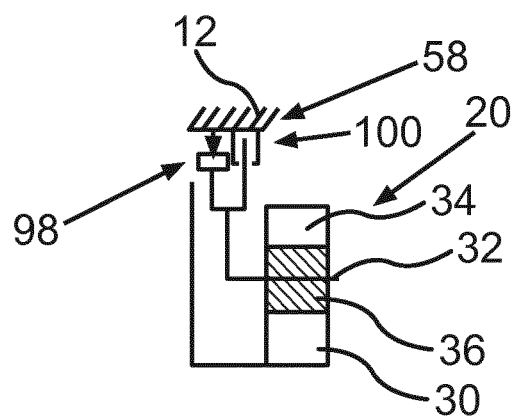

FIG. 2c shows a fourth embodiment in which the positive-locking element of the switching element 58 is designed as a freewheel, in particular a switchable freewheel. In the fourth embodiment, the switching element 58 is designed as a whole or exclusively as a freewheel, in particular a switchable freewheel, by means of which the planet carrier 32 can be non-rotatably connected to the housing 12 in a first direction of rotation running around the main axis of rotation 38. In a second direction of rotation opposite to the first direction of rotation, the freewheel permits relative rotations between the planet carrier 32 and the housing 12. Since in the fourth embodiment the switching element 58 exclusively comprises the, in particular switchable, freewheel, in the fourth embodiment the planet carrier 32 can be non-rotatably connected to the housing 12 by means of the switching element 58 in the first direction of rotation exclusively in a positive-locking manner. FIG. 2d shows a fifth embodiment in which the positive-locking element designated 98 in FIG. 2d is designed as the previously described, in particular switchable, freewheel. In addition, as in the third embodiment, the switching element 58 comprises a frictionally engaged switching element 100 designed, for example, as a brake, in particular as a friction brake, or as a lamella switching element. Thus, in the fifth embodiment, the planet carrier 32 can be non-rotatably connected to the housing 12 by means of the switching element 58 both in a positive-locking manner (positive-locking element 98) and in a force-fitting or frictional manner (frictional switching element 100).

FIG. 3 shows a sixth embodiment in which the switching element 56 is designed, in particular as a whole or exclusively, as a frictional or force-fitting switching element and thus, for example, as a lamella switching element. The switching element 56 is arranged radially above the planetary gear set 18, such that at least a part of the planetary gear set 18 is covered by the switching element 56 in the radial direction outwards. In this case, the inner lamella carrier 92 of the switching element 56, which is designed as a lamella switching element, is formed integrally with the connecting element 94, which in turn is non-rotatably connected, in particular permanently, to the second sun gear 30. By way of example, the ring gear 26 is formed integrally with the connecting element 94, or else the ring gear 26 and the connecting element 94 are formed as parts which are formed separately from each other and are non-rotatably connected to each other, in particular permanently. In particular, the ring gear 26 can be non-rotatably connected to the connecting element 54 by means of a plug-in or welded connection. Alternatively, or additionally, the sun gear 30 is non-rotatably connected to the connecting element 94 via a plug-in or welded connection, in particular permanently. Thus, for example, the sun gear 30 and the connecting element 94 are formed as separately formed and, in particular permanently, non-rotatably connected parts that are non-rotatably connected to each other via a plug-in or welded connection. Alternatively, or additionally, the ring gear 26 and the connecting element 94 are formed as separately formed and, in particular permanently, non-rotatably connected parts that are non-rotatably connected to each other, for example, via a plug-in or welded connection. In addition, it is preferably provided that the inner lamella carrier 92 and the connecting element 94 are formed integrally with each other. An advantageous decoupling can be ensured via the non-rotatable connection which is or can be implemented via a plug-in connection or welded connection.

FIG. 4 shows a seventh embodiment, in which a connecting piece 102 in the form of a hollow shaft is provided. The connecting piece 102 is also referred to as a hollow shaft piece, which is arranged in the radial direction between the differential housing 62 and the sun gear 30 and is non-rotatably connected, in particular permanently, to the ring gear 34 and, in particular permanently, to the output shaft 52. In this case, the differential housing 62 is arranged at least partially, in particular at least predominantly or completely, in the hollow shaft piece, wherein the hollow shaft piece passes through the sun gear 30, which is designed as hollow shaft or in the manner of a hollow shaft, in particular completely. Via the connecting piece 102, the ring gear 34 and/or the parking lock 96 is permanently non-rotatably connected to the planet carrier 24, in particular bypassing the output shaft 52. In this way, a particularly advantageous elastic connection of the parking lock 96 and the ring gear 34 to the planet carrier 24 of the planetary gear set 18 and thus to its output can be implemented, namely by means of the second planetary gear set 20 and thereby by means of its sun gear 30.

Figure 5B:
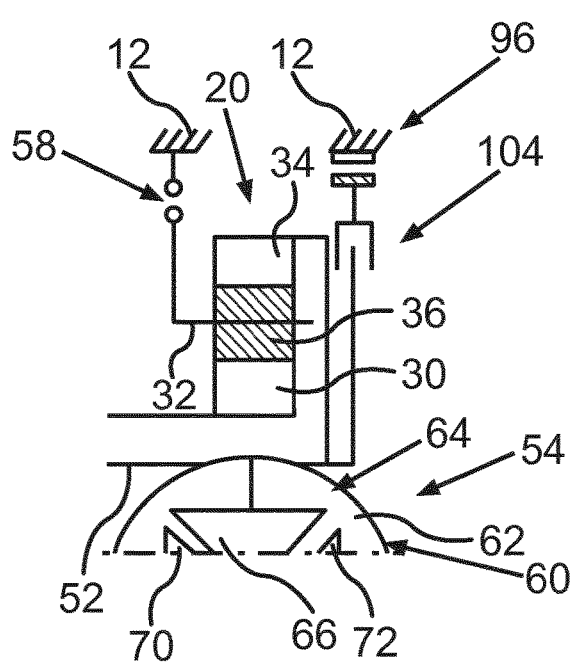

FIG. 5a shows an eighth embodiment. In the eighth embodiment, an overload clutch 104 is provided, for example in the form of a slip clutch, by means of which the differential housing 62 is non-rotatably connected to the ring gear 34 and/or to the parking lock 96. Finally, FIG. 5b shows a ninth embodiment in which an overload clutch 104, also referred to as a slip clutch or optionally designed as a slip clutch, is provided. By means of the overload clutch 104, the differential housing 62 is or can be non-rotatably connected to the parking lock 96, wherein, in the ninth embodiment, the differential housing 62 is permanently non-rotatably connected to the ring gear 34, bypassing the overload clutch 104. Thus, the overload clutch 104 is arranged between the differential housing 62, which is formed or designated as a differential basket or differential cage, for example, and the parking lock 96 or the second ring gear 34.

The overload clutch 104 is preferably a lamella clutch, which slips or slides through slightly in the event of an overload. This prevents damage to the drive device 10 when the motor vehicle, which is heavy, for example, i.e., has a high weight, is stopped and parked on a hill and the parking lock 96 is engaged or locked. When the parking lock 96 is engaged, the overload clutch 104 slips slightly or a little in the case described above before the motor vehicle then comes to a complete stop. Both the ninth embodiment and the eighth embodiment and the seventh embodiment can protect the motor vehicle and in particular its drive train, which comprises for example the drive device 10, in the above case, i.e., when the heavy motor vehicle is stopped on a hill, in particular by simply engaging the parking lock 96.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

REFERENCE NUMERAL LIST 10 drive device
12 housing
14 receiving space
16 planetary transmission
18 first planetary gear set
20 second planetary gear set
22 first sun gear
24 first planet carrier
26 first ring gear
28 first planetary gear
30 second sun gear
32 second planet carrier
34 second ring gear
36 second planetary gear
38 main axis of rotation
40 electric motor
42 stator
44 rotor
46 machine rotation axis
48 arrow
50 input shaft
52 output shaft
54 differential gear
56 first switching element
58 second switching element
60 ball-shaped differential
62 differential housing
64 receiving space
66 differential gear
68 differential gear
70 output gear 72 output gear
74 shaft
76 shaft
78 arrow
80 arrow
82 first axial bearing
84 second axial bearing
86 third axial bearing
88 fourth axial bearing
90 fifth axial bearing
92 inner lamella carrier
94 connecting element
96 parking lock
98 positive-locking element
100 frictional switching element
102 connecting piece
104 overload clutch

The invention claimed is:

1. An electric drive device for a motor vehicle, the electric drive device comprising:
   a housing;
   a first planetary gear set arranged in the housing, wherein the first planetary gear set has, as first elements, a first sun gear, a first planet carrier, and a first ring gear;
   a second planetary gear set arranged in the housing, wherein the second planetary gear set has, as second elements, a second sun gear non-rotatably coupled or non-rotatably couplable to the first ring gear, a second planet carrier, and a second ring gear non-rotatably coupled or non-rotatably couplable to the first planet carrier;
   an electric motor having a stator and a rotor;
   an input shaft driveable by the rotor, wherein the input shaft is permanently non-rotatably connected to the first sun gear;
   an output shaft;
   a differential gear;
   a side shaft;
   a first switching element non-rotatably connecting the first ring gear to the housing; and
   a second switching element non-rotatably connecting one of the second elements to the housing or to one of the first elements,
   wherein the rotor, the first planetary gear set, the second planetary gear set, and the differential gear are arranged coaxially with respect to one another,
   wherein the side shaft is arranged between the differential gear and a wheel of the motor vehicle and passes through the rotor,
   wherein the differential gear has a ball-shaped differential housing and a receiving space, wherein the differential housing is permanently non-rotatably connected to the first planet carrier,
   wherein the ball-shaped differential housing is a bevel gear differential,
   wherein the receiving space is round, spherical, or spherical in segments,
   wherein the first sun gear is arranged adjacent to the differential housing as viewed in an axial direction, wherein a largest outer diameter of the differential housing is larger than an outer diameter of the first sun gear,
   wherein the second sun gear is arranged axially overlapping the differential housing, wherein an inner diameter of the second sun gear is larger than the largest outer diameter of the differential housing, and
   wherein the first switching element is arranged radially surrounding and at least partially axially overlapping the first planetary gear set.

2. The electric drive device of claim 1, wherein the second switching element is arranged axially substantially on a side of the first planetary gear set facing away from the electric motor.

3. The electric drive device of claim 1, further comprising:
   a first axial bearing axially supporting the first planet carrier relative to the second sun gear, wherein the first axial bearing is axially arranged between the first planetary gear set and the second planetary gear set.

4. The electric drive device of claim 1, further comprising:
   a second axial bearing axially supporting the second sun gear with respect to the second planet carrier, wherein the second axial bearing is arranged on a side of the second planetary gear set facing away from the electric motor, when view in the axial direction.

5. The electric drive device of claim 1, further comprising:
   a third axial bearing supporting the second planet carrier axially with respect to the second ring gear, wherein the third axial bearing is arranged on a side of the second planetary gear set facing away from the electric motor, when seen in the axial direction.

6. The electric drive device of claim 1, further comprising:
   a fourth axial bearing supporting the first planet carrier axially with respect to the housing, wherein the fourth axial bearing is arranged axially on a side of the first planetary gear set facing the electric motor.

7. The electric drive device of claim 1, further comprising:
   a fifth axial bearing supporting the second ring gear with respect to the housing, wherein the fifth axial bearing is arranged axially on a side of the second planetary gear set facing away from the electric motor and radially inside the largest outer diameter of the differential housing.

8. The electric drive device of claim 1, wherein the first switching element is a lamella switching element, and wherein the second switching element has at least one positive-locking element.

9. The electric drive device of claim 8, wherein an inner lamella carrier of the first switching element is formed integrally with the first ring gear and is non-rotatably connected via a plug-in or welded connection to a first connecting element, wherein the first connecting element is non-rotatably connected via a plug-in or welded connection to the second sun gear.

10. The electric drive device of claim 8, further comprising:
    a second connecting element which is formed integrally with an inner lamella carrier of the first switching element and is non-rotatably connected on a first side to the first ring gear by a first plug-in or welded connection and is non-rotatably connected on a second side to the second sun gear by a second plug-in or welded connection.

11. The electric drive device of claim 1, wherein the first ring gear is non-rotatably connected to the second sun gear, and wherein the second switching element non-rotatably connects the second planet carrier to the housing.

12. The electric drive device of claim 1, wherein the second ring gear is permanently non-rotatably connected to the first planet carrier.

13. The electric drive device of claim 12, further comprising:
    a hollow shaft arranged radially between the differential housing and the second sun gear, wherein the hollow shaft permanently non-rotatably connected to the first planet carrier and to the second ring gear.

* * * * *